United States Patent [19]
Chow

[11] Patent Number: 5,768,171
[45] Date of Patent: Jun. 16, 1998

[54] METHOD AND APPARATUS FOR IMPROVING THE PRECISION OR AREA OF A MEMORY TABLE USED IN FLOATING-POINT COMPUTATIONS

[75] Inventor: Michael Chow, Cupertino, Calif.

[73] Assignee: Intel Corporation, Santa Clara, Calif.

[21] Appl. No.: 671,877

[22] Filed: Jun. 28, 1996

[51] Int. Cl.[6] .............................. G06F 7/52; G06F 7/38; G06F 1/02
[52] U.S. Cl. .............. 364/765; 364/718.01; 364/748.06; 364/748.08; 364/752
[58] Field of Search .......... 364/718.01, 718.02, 364/718.03, 718.04, 719, 720, 721, 722, 729, 735, 748.06, 748.08, 752, 765

[56] References Cited

U.S. PATENT DOCUMENTS

| | | | |
|---|---|---|---|
| 3,917,935 | 11/1975 | Lazecki | 235/156 |
| 4,696,417 | 9/1987 | Cantwell | 364/752 |
| 4,718,032 | 1/1988 | Irukulla et al. | 364/765 |
| 4,797,489 | 1/1989 | Nakano | 364/765 |
| 4,823,301 | 4/1989 | Knierim | 364/761 |
| 5,012,438 | 4/1991 | Yamaguchi | 364/765 |
| 5,153,851 | 10/1992 | Kanazawa et al. | 364/765 |
| 5,539,682 | 7/1996 | Jain et al. | 364/715.01 |

OTHER PUBLICATIONS

Koren, Israel; Computer Arithmetic Algorithms; 1993, Section 8.2, pp. 158–160.

*Primary Examiner*—Chuong Dinh Ngo
*Attorney, Agent, or Firm*—Kenyon & Kenyon

[57] ABSTRACT

A method and apparatus for calculating a value of a function $f(x)$ for a given operand x. A memory, such as a Read Only Memory, is used to stored precalculated values for some bits of the function $f(x)$ for a plurality of values of the operand x. Bits of the operand x are used to generate bits for the value of the function $f(x)$ in two ways: 1. to address the ROM to generate some bits for the value of $f(x)$, and 2. as inputs to combinational logic to generate an additional bit of the value of $f(x)$. Because one bit of the value for $f(x)$ is generated external to the ROM, the size of the ROM can be reduced without sacrificing accuracy. Alternatively, the ROM can be used to store an additional bit of precision for values of $f(x)$, thereby increasing the accuracy of these values.

25 Claims, 3 Drawing Sheets

1

METHOD AND APPARATUS FOR IMPROVING THE PRECISION OR AREA OF A MEMORY TABLE USED IN FLOATING-POINT COMPUTATIONS

BACKGROUND OF THE INVENTION

The present invention pertains to a method and apparatus for implementing arithmetic functions, and more particularly, to a method and apparatus for implementing floating point functions using a memory, such as a ROM, to assist in arithmetic computations.

Hardware devices, such as microprocessors, typically include dedicated circuitry for performing mathematical computations on operands. For example, circuitry may be dedicated for the calculation of the square root of a single operand. In environments such as Reduced Instruction Set Chip (RISC) designs, space may not be available for circuitry dedicated to the performance of certain mathematical computations. One method for reducing the area occupied by circuitry for computing specific functions is to store pre-calculated approximations for functional results over particular ranges of values for the operands in a memory such as a ROM on the microprocessor chip. These approximations are then made more precise by a highly optimized software routine such as the one known in the art as the Newton-Raphson algorithm. The Newton-Raphson algorithm is a successive approximation scheme in which each iteration roughly doubles the number of bits of precision of the previous approximation. The more accurate the first approximation, the fewer number of iterations are required to achieve the end result to a desired precision. An example of such a method is described in chapter 8 of *Computer Arithmetic Algorithms* by Israel Koren (Prentice-Hall, Inc., 1993) and also shown in FIG. 1. The IEEE standard for the representation of floating point numbers includes a mantissa of n (i.e., m+1) bits and an exponent e having a number of bits such that the normalized, floating point representation of the value x is $x = 1.b_0 b_1 b_2 b_3 \ldots b_m 2^e$, where $b_0$ represents $2^{-1}$ or 0.5, $b_1$ represents $2^{-2}$ or 0.25, etc. Thus, x can be represented as a number greater than or equal to 1 and less than 2 when the exponent e is ignored. As an example, an interval [1, 2) for x, where the exponential portion of x is ignored, can be subdivided into $2^q$ intervals, namely $[x_i, x_{i+1})$, for $i=0, 1, \ldots, 2^q-1$ (as used throughout, "[" indicates an inclusive boundary and ")" indicates an exclusive boundary). Each subinterval $[x_i, x_{i+1})$ has a length of $2^{-q}$. Referring to FIG. 1, a single ROM 1 is shown having q address lines 3 and p data lines 5. The first q bits of the mantissa of x (i.e., the most significant q bits of the mantissa) are supplied to the address lines of the ROM causing the ROM to output the value $f_i$ as a p-bit value. The value q represents the index i for the interval $[x_i, x_{i+1})$. The p bits output by the ROM are typically the mantissa for the value $f_i$ which can be a first approximation for the value f(x) ignoring the exponent. As an example, for the function f(x)=1/x, the exponent value (which can be stored in a register 8) is easily computed using external logic 6 rather than having it stored in memory. For instance, the exponent for f(x)=1/x is easily computed as the negative of the exponent for x (which can be stored in a register 4).

In the above example, the value $f_i$ is an approximation for the function f(x)=1/x over the entire range $[x_i, x_{i+1})$. After obtaining the first approximation from ROM 1, in each iteration of the Newton-Raphson scheme, the number of bits of precision is doubled as compared to the previous approximation. In FIG. 1, the Newton-Raphson scheme is implemented in optimizing element 7 which can include a processing unit executing software instructions stored in a memory. To reduce the number of iterations performed by the Newton-Raphson scheme requires an increase in the precision of the approximation stored in the ROM 1. In implementing such a system, the entire x domain (or the desired portion thereof) for the function f(x) can be partitioned into n equally sized adjacent partitions $[x_0, x_1), [x_1, x_2), \ldots, [x_{n-2}, x_{n-1})$, where $n=2^q$. For each interval, i, the value, $f_i$, which is a best approximation for the function f(x) over the entire interval $[x_i, x_{i+1})$ is determined. The length of $f_i$, represented as a number of bits, p, is predetermined based on a desired precision for that value. All values for $f_i$ are stored permanently in the i'th location of an on-chip ROM 1 having a width p. In calculating a value for f(x), the interval partition $[x_i, x_{i+1})$ in which x lies is determined. Then, the value stored in the ROM 1 for the selected interval partition is retrieved as a first approximation to the value f(x).

Several options are available as to what value $f_i$ should be selected. One option would be the average of the maximum value for f(x) and the minimum value for f(x) over a given interval $[x_i, x_{i+1})$. By choosing such a value for $f_i$, no matter where x falls in the interval, the maximum error $d_i$ for the interval is less than or equal to the difference between the maximum of f(x) and the minimum of f(x) divided by 2. No other choice for $f_i$ will yield a lower value for $d_i$.

Using a ROM to calculate an approximation for a function such as f(x)=1/x will unavoidably include an error in the final result. Specifically, such an error has two components: 1) an approximation error representing the error between the actual value for f(x) and the approximation for a given interval $f_i$; and 2) a truncation error that results from the ROM having a finite width of p bits. As a worst case, the total error would be an addition of the approximation error and the truncation error but is typically a lesser value. The approximation error is controlled by the parameter q, which has an exponential effect on the size of the ROM (i.e., a ROM having q address lines can have as many as $2^q$ addressable locations). The truncation error is controlled by the value p, which has a linear effect on the size of the ROM (i.e., each addressable location of the ROM must have p bits).

The function f(x)=1/x is a monotonically-decreasing function of x where the maximum error $d_i=f(x_i)-f(x_{i+1})$ for all $i=0, 1, 2, \ldots, 2^q-1$. Furthermore the second derivative of f(x) (i.e., f"(x)) is greater than 0, thus $d_i$ decreases as x increases. The maximum value for $d_i$ would then be $d_0$. By replacing the value 1/x with $f_i$=RoundUp$[1/(x+2^{-q})]$, the value $d_0=(f(1)-f(1-2^{-q}))/2<2^{-(q+1)}$ is obtained. As x varies between 1 and 2, 1/x varies between 1 and 0.5. Therefore, the normalized floating-point binary representation of the mantissa of 1/x is $1.c_0 c_1 c_2 c_3 \ldots c_m$, where $c_0=1$ and the unbiased exponent is −1. Thus, the p bits of each ROM location can be used to store values for $c_1, c_2, \ldots, c_p$. With p bits of accuracy and the assumption that $c_0$ is 1 insures that the truncation error is no more than $2^{-(p+1)}$ and the total error (which is at most the approximation error added to the truncation error) is $2^{-(q+1)}+2^{-(p+1)}$.

If accuracy is required to be less than a predetermined number E, then the relationship between parameters p and q can be determined. For the value q, $2^{-(q+1)}$, which is the maximum approximation error, must be less than E. Thus q can have a value up to $[\log_2(1/E)-1]$. Once the value for q has been determined, the value for p can be calculated accordingly. Given the values for q and p, the size of the ROM is determined. The lower total error that is allowed for a given function, the higher the values for p and q, which leads to a larger ROM. As stated above, space in certain environments such as RISC architectures either may be too costly or not available, thus it may become necessary to decrease the size of the ROM, which results in a sacrifice of accuracy.

Looking again at FIG. 1, and assuming that the value for q is 8, there are 8 bits provided to address $2^8$ memory locations. The value stored for the address is equal to the midpoint of f(x) and f(x+dx) where dx is equal to the next increment for the q-bit fractional value of x (i.e., $2^{-8}$). The worst-case-scenario for the error of the approximation for f(x) output by the ROM 1 would be $2^{-9}$ (thus the approximation error for q=8 is $2^{-9}$). In equation form, if the ROM 1 contains values for the function f(x)=1/x, then the value stored for a given value of the 8-bit fractional value of x would be RoundUp[1/(x+$2^{-9}$)]. Due to truncation, the 8-bit fractional value of x represents values between x and x+$2^{-8}$, exclusive, and the value x+$2^{-9}$ represents a mid-point between x and x+$2^{-8}$. In this example, the value for p is 10, and 10-bit values are stored in each address of the ROM 1. As stated above, since the $2^{-1}$ value is always 1 for the operand x, the ROM need only store values for $c_1 c_2 \ldots c_{10}$. Thus, the maximum truncation error for the values stored in the ROM 1 is $2^{-12}$. This is because the pre-computed result was rounded up at the $2^{-12}$ bit position. The total error for the scheme shown in FIG. 1 for computing the function f(x)=1/x would be $2^{-9}+2^{-12}$ or $2^{-8.83}$.

There are several drawbacks to the method shown in FIG. 1. First, the physical size of the ROM takes up valuable space in the design (e.g., of a microprocessor system). Also, the use of the ROM as described above has certain limitations as to the precision of the results achieved for the function f(x)=1/x. Accordingly, there is a need for a method and apparatus for performing these types of computations that decreases the size of memory needed without sacrificing accuracy. There is also a need for a method and apparatus that increases the precision of values stored in a ROM table for computing a given function f(x).

SUMMARY OF THE INVENTION

These and other needs are satisfied by the method and apparatus of the present invention. In a first embodiment of the present invention, the precision of using the ROM 1 of FIG. 1 is increased by using combinational logic to calculate one of the bits for the value of the function f(x). Thus, if the ROM 1 of FIG. 1 is used to store 10 bits of the value for f(x) (i.e., $c_1 c_2 \ldots c_{10}$), the memory of the present invention can be used to store bits of a higher precision (i.e., $c_2 c_3 \ldots c_{11}$). Therefore, the resulting value for the function f(x) will be represented by a larger number of bits and be of a higher precision.

In a second embodiment of the present invention, the precision of the value for f(x) is kept the same. However, since one of the bits for the value for f(x) is determined using combinational logic, that bit need not be stored in the memory. Thus for a memory that typically stores 10-bit values (e.g., the ROM 1 of FIG. 1), the memory need only store 9 bits according to the present invention. This results in a savings of 10% in the size of the memory with only a slight increase in the amount of external circuitry needed to generate a value for f(x).

DETAILED DESCRIPTION

Figure 1:
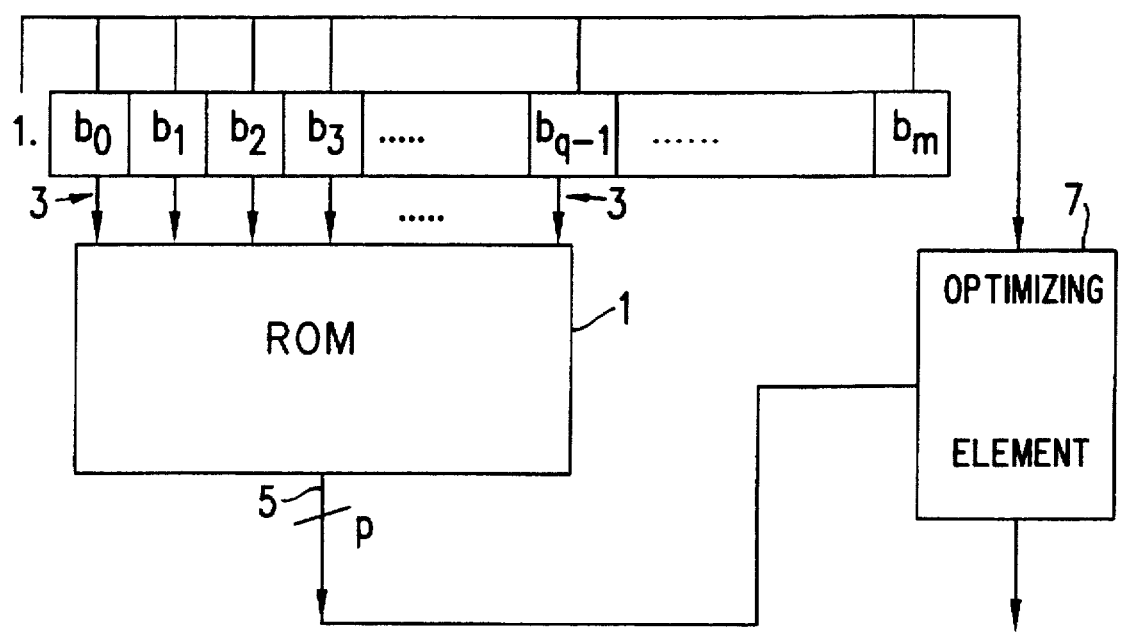
FIG. 1 is a block diagram representation of a circuit for calculating the function f(x)=1/x using a single ROM as known in the prior art.
Figure 2:
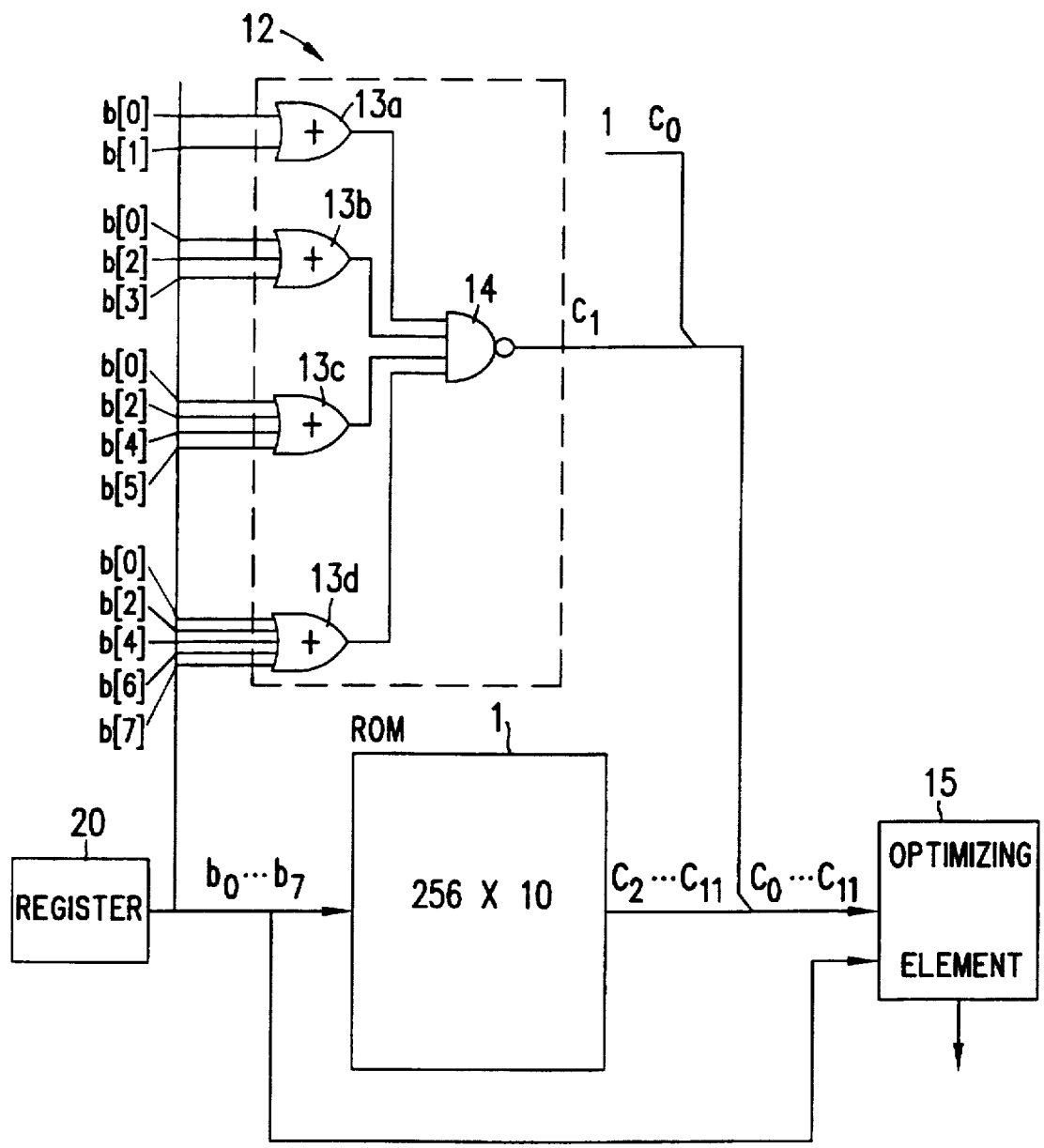
FIG. 2 is a block diagram representation of a circuit constructed according to the present invention for calculating the function f(x)=1/x using external circuitry to calculate part of the value for f(x), and having a precision for the value of f(x) greater than that for the circuit of FIG. 1.

Referring to FIG. 2, a block diagram is shown of a circuit for performing the calculation of f(x)=1/x using external circuitry to the ROM 1 is shown. According to a first embodiment of the present invention, the precision of the values for f(x) using the ROM 1 is increased by one place such that the resulting value for f(x) has 12 bits of precision. In other words the value for f(x) has a format $1.c_0 c_1 \ldots c_{11} \times 2^e$ where the mantissa has a value c, or 12 bits, of precision while the apparatus shown in FIG. 1 provides only has 11 bits of precision. As with the apparatus of FIG. 1, the exponent for the value of x and f(x) is handled by external circuitry. As stated above, bit $c_0$ is presumed to be 1 as shown in the FIG. 2 in the top-center of the diagram. The value for $c_1$ is calculated using combinational logic 12.

The value for second most significant bit of the value of f(x), $c_1$ (i.e., the $2^{-2}$ value) is always 1 when f(x)=1/x is less than 1 but greater than or equal to 0.75 (excluding the exponent). The value of x that yields such a result is in the range (1.00000000, 1.01010100] in binary for an 8-bit fractional part of the mantissa. The values that are stored in the ROM 1 can be calculated based on a rounding up of the value for 1/x such that f(x)=RoundUp[1/(x+$2^{-9}$)]. Due to the addition of $2^{-9}$ to the value of x, a value for x=1.01010101 will yield a value for f(x)=0.7496. In order to insure that the combinational logic works as fast as an access to the ROM 1, the combinational logic should be no more than 5 levels.

Looking at the normalized floating point representation of x in FIG. 1, if $b_0 b_1$ is 00, then it is known that the value for f(x) would be greater than 0.75 and thus the value for $c_1$ would have to be 1. If $b_0 b_1$ is 11 or 10, then the value for f(x) is less than 0.75 and the value for $c_1$ is 0. When $b_0 b_1$ is 01, then the value for f(x) may fall in the range (1.0, 0.75]. If the 8-bit fractional portion of the mantissa of x is treated as an integer, then the values between 64 and 84 all will yield values for f(x)=1/x where $c_1$ is 1 and is addressed by the combinational logic 12. These values are shown in Table 1

TABLE 1

| fractional portion of x as an integer | $b_0 b_1 b_2 b_3 b_4 b_5 b_6 b_7$ |
|---|---|
| 64 | 01000000 |
| 65 | 01000001 |
| 66 | 01000010 |
| 67 | 01000011 |
| 68 | 01000100 |
| 69 | 01000101 |
| 70 | 01000110 |
| 71 | 01000111 |
| 72 | 01001000 |
| 73 | 01001001 |
| 74 | 01001010 |
| 75 | 01001011 |
| 76 | 01001100 |
| 77 | 01001101 |

TABLE 1-continued

| fractional portion of x as an integer | $b_0b_1b_2b_3b_4b_5b_6b_7$ |
|---|---|
| 78 | 01001110 |
| 79 | 01001111 |
| 80 | 01010000 |
| 81 | 01010001 |
| 82 | 01010010 |
| 83 | 01010011 |
| 84 | 01010100 |

If the fractional portion of x is in the range of |64, 79| then $b_0$, $b_2$, and $b_3$ are all zeroes. If the fractional portion of x is in the range of |80,83| then $b_0$, $b_2$, $b_4$ and $b_5$ are all zeroes. If the fractional portion of x is 84 then $b_0$, $b_2$, $b_4$, $b_6$, and $b_7$ are all zeroes. The value for $c_1$ in the output for f(x)=1/x can then be expressed as an equation, namely:

$$c_1 = (b_0 \cdot b_1) + (b_0 \cdot b_2 \cdot b_3) + (b_0 \cdot b_2 \cdot b_4 \cdot b_5) + (b_0 \cdot b_2 \cdot b_4 \cdot b_6 \cdot b_7) \qquad \text{Eq. 1}$$

which can be reduced to the following equation:

$$c_1 = ((b_0 + b_1) \cdot (b_0 + b_2 + b_3) \cdot (b_0 + b_2 + b_4 + b_5) \cdot (b_0 + b_2 + b_4 + b_6 + b_7))' \qquad \text{Eq. 2}$$

This equation can be implemented as two levels of logic having a maximum fanout of four at the most. If a so-called OR-AND-INVERT (OAI) gate is used, only one level of logic is needed to implement the combinational circuitry 12 of FIG. 2. The appropriate bits of the value for x are input to OR gates 13a–d in accordance with Eq. 2, above. The outputs of the OR gates 13a–d are input to a NAND gate 14, and the output will be the $c_1$ bit for the approximation. As described above, the value for $c_0$ is presumed to be a value of 1. The remaining ten bits are output by the ROM 1 based on the address appearing as bits $b_7$ to $b_0$, which can be stored in a register 20. Therefore, according to this first embodiment of the invention, the precision of the value for f(x) output by the circuit has been increased over the method shown in FIG. 1 by 1 bit. The truncation error is reduced from $2^{-12}$ to $2^{-13}$ and the total error has been reduced to $2^{-9} + 2^{-13}$ or $2^{-8.91}$. The value for f(x) output by the ROM can be treated as an approximation and supplied to an optimizing element 15 which can implement the Newton-Raphson algorithm as described above with respect to FIG. 1.

Figure 3:
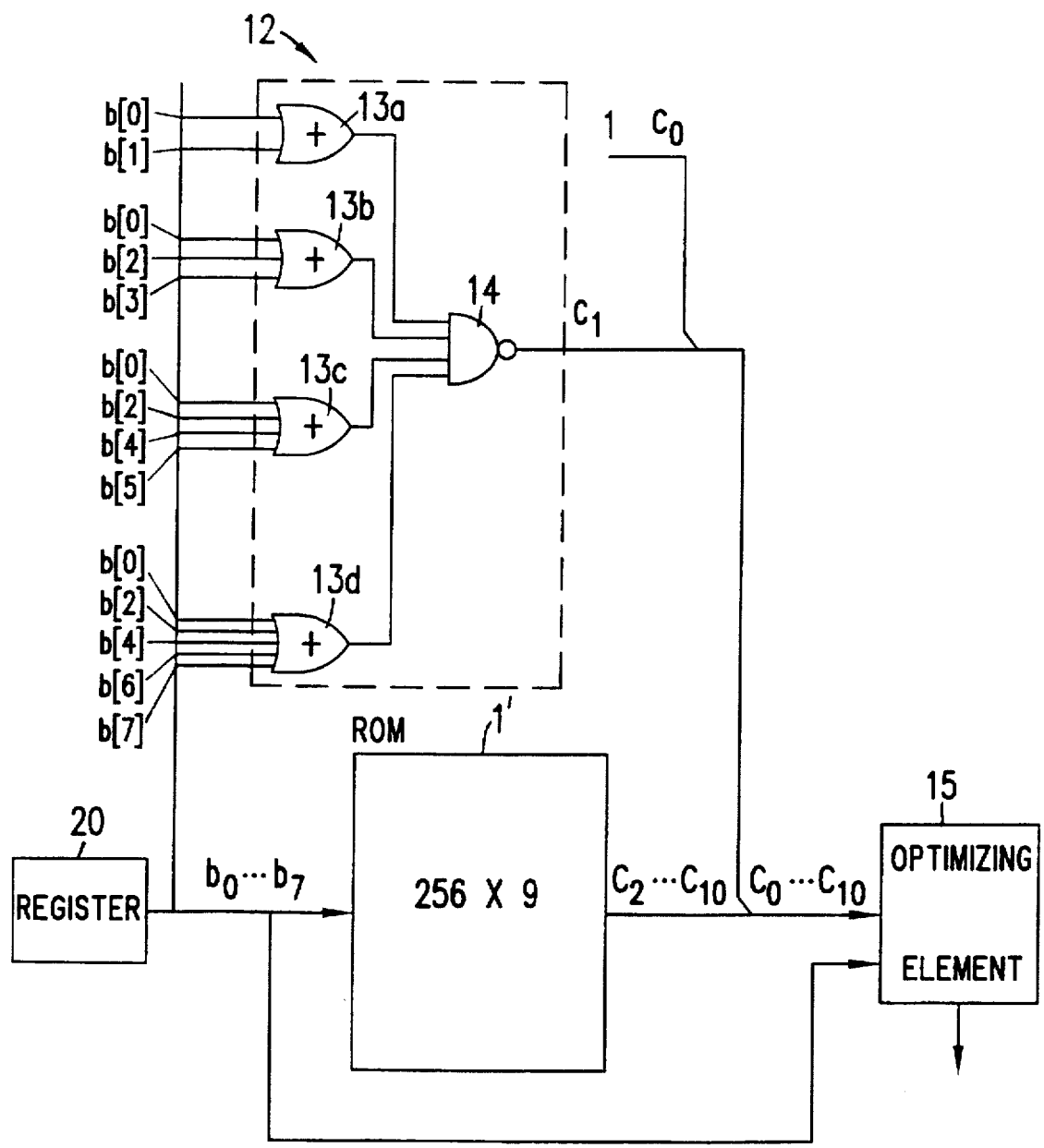
FIG. 3 is a block diagram representation of a circuit constructed according to the present invention for calculating the function f(x)=1/x using external circuitry to calculate part of the value for f(x), and having a memory smaller in size than the one shown in FIG. 1.

In an alternative embodiment of the present invention, shown in FIG. 3, the size of the ROM 1 in FIG. 2 is reduced in size by 10% by using a 256×9 ROM 1'. In this embodiment, the extra bit of precision (e.g., bit $c_{11}$, the least significant bit) that was stored in ROM 1 of FIG. 2 is not stored in the ROM 1' of FIG. 3. Therefore, 9 bits are stored in the ROM 1' rather than the 10 bits stored in ROM 1' of FIG. 2. The precision and total error are the same for the circuits shown in FIGS. 1 and 3.

One skilled in the art will appreciate that the present invention can be used for functions other than f(x)=1/x. For example, the present invention can be used for the function f(x)=1/sqrt(x). Also, though a ROM is shown in FIGS. 2 and 3, other memory devices can be used such as Random Access Memory (e.g., SRAM or DRAM), etc.

What is claimed is:

1. A method of computing the value of a mathematical function f(x) of an operand x including n bits, comprising:

precalculating values for the function f(x) for a plurality of values for the operand x;

storing a first number of bits for each of said precalculated values of f(x) in a memory device;

supplying a second number of bits of the operand x to address inputs of said memory device;

outputting from said memory device the first number of bits for the value of f(x) for the operand x;

determining an additional bit of the value of f(x) for the operand x based on a combination of bits in said operand x.

2. The method of claim 1 wherein the operand x is represented in a floating point manner such that a mantissa of the operand x is greater than or equal to 1 and less than 2.

3. The method of claim 2 wherein further comprising:

dividing a range of values for the mantissa of the operand x into subintervals, such that in said precalculating step, said plurality of values for the operand x comprises a single value in each of said subintervals of said range of values.

4. The method of claim 1 wherein said memory device is a Read Only Memory device.

5. The method of claim 1 wherein said function f(x) is equal to the reciprocal function of x.

6. The method of claim 1 further comprising:

operating on the value for the function f(x) to increase its precision.

7. The method of claim 6 wherein said operating step comprises operating on the value for the function f(x) with a Newton-Raphson algorithm.

8. An apparatus for computing the value of a mathematical function f(x) of an operand x, comprising:

a register having n locations storing n bits of the operand x;

a memory device having a first number of output lines and a second number of address inputs coupled to a plurality of said n register locations, said memory device storing a plurality of precalculated values having a first number of bits for the value of the function f(x) for values of the operand x; and combinational logic having a plurality of inputs and an output, said inputs coupled to a plurality of said n register locations, said combination logic outputting a bit of the function f(x) for each operand value.

9. The apparatus of claim 8 wherein the operand x is represented in a floating point manner such that said register stores a mantissa of said operand x.

10. The apparatus of claim 8 wherein said memory device is a Read Only Memory device.

11. The apparatus of claim 8 wherein said function f(x) is equal to the reciprocal function of x.

12. The apparatus of claim 11 wherein said combinational logic is an OR-AND-INVERT gate.

13. The apparatus of claim 11 wherein said combination logic includes the following:

a first OR gate having an output and two inputs coupled to two of said n register locations;

a second OR gate having an output and three inputs coupled to three of said n register locations;

a third OR gate having an output and four inputs coupled to four of said n register locations;

a fourth OR gate having an output and four inputs coupled to four of said n register locations; and a NAND gate having four inputs coupled to the outputs of said first, second, third and fourth OR gates, said NAND gate outputting the bit for said value of the function f(x).

14. The apparatus of claim 8 further comprising:

an optimizing circuit having an input capable of receiving the bits for the value f(x), such that said optimizing circuit increases a precision of the value for the function f(x).

15. The apparatus of claim 14 wherein said optimizing circuit operates according to a Newton-Raphson algorithm.

16. The apparatus of claim 8, wherein said register, said memory device, and said combinational logic are contained on a microprocessor chip.

17. An apparatus for computing the value of a mathematical function $f(x)=1/x$ of an operand x, said value for the function $f(x)$ having a first number, c of bits of precision, comprising:

a register having n locations storing n bits of the operand x;

a memory device having c−2 output lines and a first number of address inputs coupled to a plurality of said n register locations, said memory device storing a plurality of precalculated values having c−2 bits for the value of the function $f(x)$ for values of the operand x; and combinational logic having a plurality of inputs and an output, said inputs coupled to a plurality of said n register locations, said combinational logic outputting a bit for said value of the function $f(x)$.

18. The apparatus of claim 17 wherein the operand x is represented in a floating point manner such that said register stores a mantissa of said operand x.

19. The apparatus of claim 17 wherein said memory device is a Read Only Memory device.

20. The apparatus of claim 17 wherein said function $f(x)$ is equal to the reciprocal function of x.

21. The apparatus of claim 20 wherein said combinational logic is an OR-AND-INVERT gate.

22. The apparatus of claim 20 wherein said combinational logic includes the following:

a first OR gate having an output and two inputs coupled to two of said n register locations;

a second OR gate having an output and three inputs coupled to three of said n register locations;

a third OR gate having an output and four inputs coupled to four of said n register locations;

a fourth OR gate having an output and four inputs coupled to four of said n register locations; and a NAND gate having four inputs coupled to the outputs of said first, second, third and fourth OR gates, said NAND gate outputting the bit for said value of the function $f(x)$.

23. The apparatus of claim 22 wherein said combinational logic outputs the second most significant bit for the value for the function $f(x)$.

24. The apparatus of claim 17 further comprising:

an optimizing circuit having an input capable of receiving the bits for the value $f(x)$, such that said optimizing circuit increases a precision of the value for the function $f(x)$.

25. The apparatus of claim 24 wherein said optimizing circuit operates according to a Newton-Raphson algorithm.

* * * * *